Sept. 30, 1941.   J. A. ROCHE   2,257,483
TENSION GAUGE
Filed Feb. 3, 1940
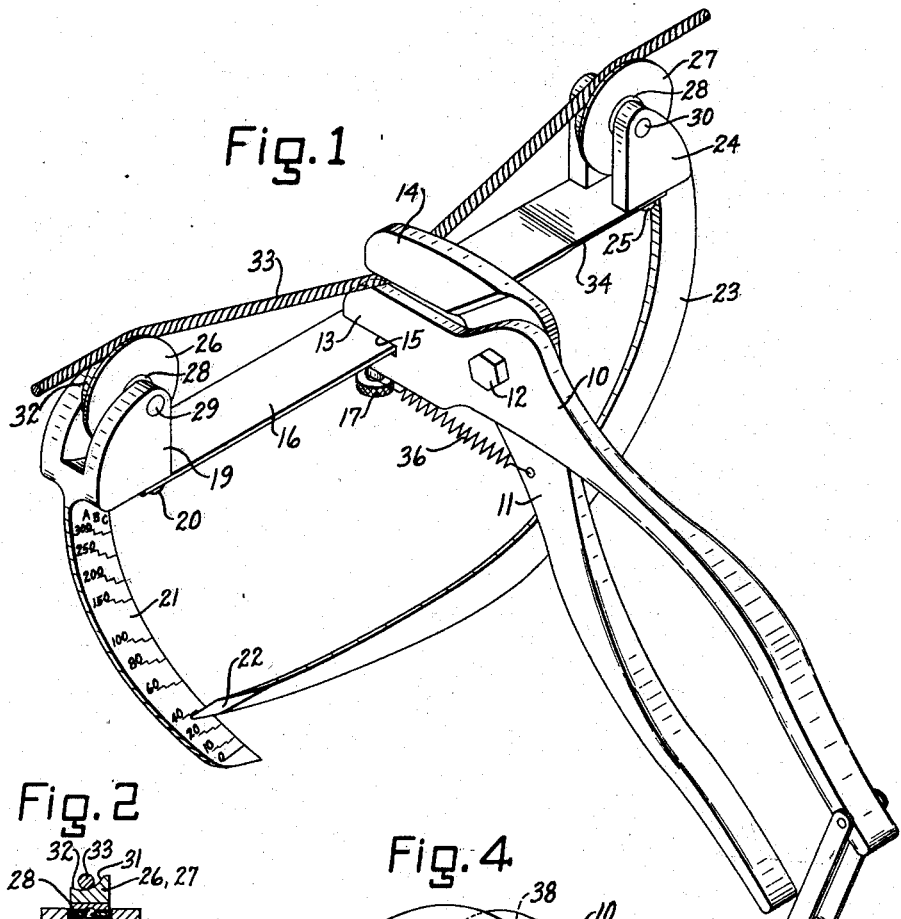
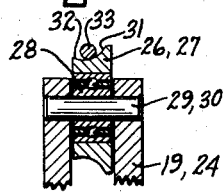
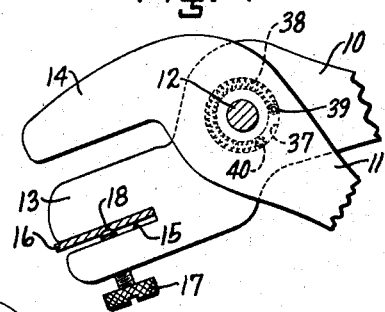
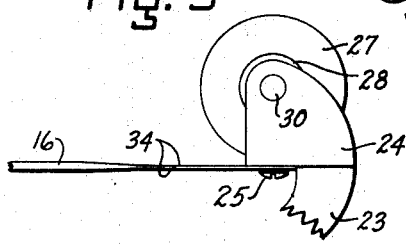
INVENTOR,
JEAN A. ROCHÉ
BY Richard Van Buren
HIS ATTORNEY Patented Sept. 30, 1941

2,257,483

UNITED STATES PATENT OFFICE 2,257,483

TENSION GAUGE

Jean A. Roché, Dayton, Ohio

Application February 3, 1940, Serial No. 317,059

10 Claims. (Cl. 265—1.6)

This invention relates to gauging devices for gauging the tension load of flexible elements, such as cables, rods, wires, strips and the like, such devices being commonly referred to as "tensiometers."

Devices of the above class heretofore constructed, while serving the purpose in a more or less satisfactory manner, have many objectionable points.

One of the chief objections to these former devices is that they are of bulky construction, requiring considerable room for application and operation and lacking portability.

Another objection is that such devices have delicate and complicated mechanisms requiring specially trained mechanics for the proper operation thereof, and are subject to mal-adjustment when used by untrained mechanics. Moreover these delicate mechanisms are easily damaged by abuse, dust and corrosion, and may, after a rather short period of use, become inaccurate due to excessive lost motion caused by friction and the wearing of the delicate parts.

It can easily be seen that such devices are not practical for use by an average mechanic, or handy man, neither are they practical for use, for example, at an airport for the testing of the control cables, wires and tie-rods of an aircraft while such cables, wires and rods are installed on said aircraft.

It is therefore an object of this invention to provide a tensiometer that overcomes all the objectionable points outlined above.

Another object is the provision of a light, compact and readily portable device of comparatively simple structure for gauging the tension of cables, wires, rods, etc., while they are installed in working positions so as to ascertain and adjust their tensions under working conditions.

Another object is to supply a tensiometer that is small in size and that is adapted to be operated by one hand so that it may be used in places that are difficult of access, such as small inspection holes in th fuselage or wing structure of an aircraft.

A further object is the provision of a small and compact tensiometer that gives a direct reading or indication of the tension-load in the cables, wires and tie-rods of an aircraft so that such cables, wires and tie-rods may be quickly and easily adjusted to the proper tensions to avoid dangerous flutter and vibration in flight.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

In the drawing:

Fig. 1 is a perspective view of the complete gauging device.

Fig. 2 is a detail view, in cross-section, of one of the work-supporting rollers.

Fig. 3 is a fragmentary view showing the contour of the leaf-spring.

Fig. 4 is a detail view showing one type of spring used for holding the jaws of the tension member deflecting pliers open.

Description

As stated earlier herein, the present invention is directed to a small compact and efficient device intended primarily for use in gauging the tension-load of various tension members such as cables, wires and rods used in the construction of aircraft. However, it is not the desire to limit this device to the above use, as with minor alterations it may be adapted for use in various other ways. The device of this invention, while small, is very rugged; will stand considerable abuse; has no complicated mechanical parts, and is constructed to give a direct reading of the tension-load of the member being gauged. It is therefore evident that such a device may be efficiently used by the average mechanic or handy man without any special training, and without resorting to the use of graphs, charts or conversion tables.

In the ensuing explanation this device will be described in detail.

Referring to the drawing, the means for flexing the tension members, the tension of which is to be gauged, comprises a plier-like device having similar halves 10 and 11 turnably supported in relation to each other by a bolt 12 threaded in the part 11. The two similar halves terminate in handles for the convenient manipulation of the device by the use of one hand. Each of the halves 10 and 11 have respective jaw portions 13 and 14 for gripping and deflecting the tension members to be gauged. The lower jaw portion 13 has therein a slot 15 adapted to receive a leaf-spring 16 which forms the actuating medium of the tension gauge. A clamp screw 17, threaded in the lower jaw 13, engages a drill spot 18 (Fig. 4) near the center of the leaf-spring 16 to secure said leaf-spring against displacement and to locate the plier-like device in relation to said leaf-spring. If for any reason it is desired to eliminate the drill spot 18 in the leaf-spring 16, locating lines may be engraved on the forward end of the lower jaw and the front edge of the leaf-spring, said lines effective when brought into coincidental relationship, for locating said leaf-spring in relation to said plier-like device.

A bracket 19 is secured on the lefthand end of the spring 16 by two screws 20, and said bracket has a depending dial portion 21 with three sets of graduations (A, B and C) adapted to cooperate with a finger 22 of a pointer 23 integral with a bracket 24 secured on the righthand end of the leaf-spring 16 by two screws 25. The pointer 23 is shaped so as to properly clear the lower jaw 13 and the screw 17. Each of the brackets 19 and 24 has a vertical slot adapted to receive one of two similar tension member engaging rollers 26 and 27, which are turnably mounted in said grooves by means of combination radial and thrust ballbearings 28, the outside diameters of which are pressed into borings in said rollers 26 and 27, and the holes in the center of which are a snug fit on pins 29 and 30 secured respectively in the brackets 19 and 24. The rollers 26 and 27 have identical tension member engaging grooves 31 therein, the outer flanges of said grooves being undercut, as shown at 32 (Figs. 1 and 2) to assist in engaging said grooves with tension members such as a cable, indicated at 33, the tension of which is to be gauged. The leaf-spring 16, in cooperation with the brackets 18 and 24, maintains the grooves 31 in the rollers 26 and 27 in alinement so as to guide the tension member 33 between the jaws 13 and 14 of the plier-like device.

It will be noted that the handles 10 and 11 of the plier-like device are offset with relation to dial 21. This is to facilitate the use of the tensiometer in cramped quarters, to assist in passing the instrument through small inspection holes and to maintain the dial 21 normal to the line of vision for easy reading by the operator.

In using the tensiometer, the handles 10 and 11 are gripped in one hand, the grooves 31 in the rollers 26 and 27 engaged with the cable 33, the tension of which is to be ascertained, after which the jaws 13 and 14 are closed to deflect said cable downwardly in relation to said rollers 26 and 27, as shown in Fig. 1. During the deflecting of the cable 33, the tension load thereof flexes the leaf-spring 16, causing the pointer 23 and the dial 21 to move in relation to each other.

The leaf-spring 16 is properly undercut, or thinned, as indicated at 34 (Figs. 1 and 3) near its righthand end, so that the portion of said spring supporting the bracket 24 and pointer 23 will flex more than the portion of said spring supporting the bracket 19 and dial 21. This causes the pointer 23 to move in an arc with the pointer 34 as a fulcrum while the dial 21 remains substantially stationary, thus making it possible for said pointer to traverse the entire portion of the scales A, B and C, if necessary.

The leaf-spring 16 has a fixed co-efficient of flexing movement, consequently the tension-load of any tension member clamped between the jaws of the plier-like device will be indicated by the pointer 23 in cooperation with the graduations on the dial 21. The ball bearings 28 are provided for reducing the friction against the cable 33 so that the leaf-spring 16 will receive its full flexing movement when the tension-load is applied thereto.

The three sets of graduations or scales A, B and C are provided in lieu of graphs, charts and/or conversion tables for determining the tension of different types of tension members; for example, the set of graduations comprising the scale C may be used for determining the tension of cables; the set of graduations comprising the scale B may be used for determining the tension of rods of round cross-section, and the graduations comprising the scale A may be used for determining the tension of rods of square cross-section.

In case it is desired to secure the tension-gauging device to the tension member being gauged, the handles 10 and 11 (Fig. 1) of the plier-like device may be clamped together by a clamp 35 which is pivotally connected to the handle 10 and is adapted to slip over the end of the handle 11 to secure the tension member between the jaws 13 and 14. This frees both hands of the operator for other work, such as the adjusting of the tension member being gauged to the desired tension, which tension will be indicated in pounds by the pointer 23 in cooperation with the graduations on the dial 21.

A spring 36, tensioned between the screw 17 and the handle 11, normally maintains the jaws of the plier-like device in open position, for convenient application of the tensiometer to the tension member. An alternative type of spring is shown in Fig. 4, for accomplishing the same purpose as the spring 36. In this latter case, each half 10 and 11 of the plier-like device has a half-round groove 37 cut therein concentric with the bolt 12, said half-round grooves, when facing each other, forming a circular groove adapted to receive a small compressible spring 38, opposite ends of which engage respectively a stud 39 in the handle 11 and a stud 40 in the handle 10, said spring exerting its tension to normally maintain the jaws 13 and 14 open.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. A tension gauging device comprising in combination two guides serving as supports for a tension member; a flexible element connecting the two guides; an anvil mounted on the flexible element intermediate the two guides; two manually operable levers one of which is connected to the anvil and the other having a finger-like extension in operative alinement with the anvil and adapted upon operation of the levers to force the tension member into contact with the anvil to deflect the flexible element in proportion to the tension of said tension member; and means mounted on the guides and actuated by deflection of the flexible element to indicate the tension of the tension member.

2. In a device for gauging the tension-load of tension members, said device adapted to be applied to the tension members and operated by the use of one hand, the combination of a flexible element; an anvil secured substantially in the middle of the flexible element and in fixed relationship thereto; tension member engaging means mounted on each end of the flexible element and effective when applied to a tension member to position said member a predetermined distance away from the anvil; a plier-like contrivance comprising levers pivoted together to form handles, one of said handles being integral with the anvil and the other having an extension which overlies the tension member and the anvil when the device is in operating position, said extension being effective upon operation of the plier-like contrivance to force the tension member into contact with the anvil to flex the flexible element in proportion to the tension-load of said tension member; and tension indicating means comprising a graduated sector connected to one of the tension member engaging means in such a manner as to be readily visible when the device is in operating position and a pointer connected to the other tension member engaging means and cooperating with the graduations on the sector, said sector and pointer adapted to be moved in relation to each other upon the flexing of the flexible element to indicate the tension-load of the tension member.

3. In a device for gauging the tension-load of tension members, said device adapted to be applied and operated by the use of one hand, the combination of a leaf-spring reduced in thickness at one end to increase the flexibility thereof; a tension member supporting means mounted on each end of the leaf-spring; a plier-like device mounted on the leaf-spring intermediate the tension member supporting means, said plier-like device having handles for the application and operation thereof and jaws operated by the handles for gripping and deflecting the tension member in relation to the tension member supporting means to flex the leaf-spring in proportion to the tension-load of said tension member; and means including a graduated dial mounted on one of the tension member supporting means, and a pointer mounted on the other tension member supporting means, which means is adjacent to the reduced portion of the leaf-spring, said pointer adapted to be actuated in relation to the dial by the flexing of said leaf-spring to indicate the tension-load of the tension member.

4. In a compact and readily portable device for gauging the tension of a tension member, the combination of a flat flexible element, the thickness of which is reduced near one end to substantially increase the flexibility of said element at said one end; a grooved guide roller mounted on the reduced end of the flexible element; a grooved guide roller mounted on the other end of the flexible element, in alinement with the other grooved roller, said grooved rollers adapted to serve as guides and supports for the tension member; a pointer mounted on the reduced end of the flexible element; a scale mounted on the other end of the flexible element, said scale having graduations corresponding to various tensions; and a manually operable plier-like device mounted on the flexible element intermediate the grooved rollers, said plier-like device having jaws for gripping and deflecting the tension member in relation to said rollers, which in turn bends the flexible element in proportion to the tension of said tension member to move the pointer and the scale differentially, in relation to each other, to cause said pointer, in cooperation with the graduations on the scale, to indicate the tension of the tension member.

5. In a compact and readily portable device for gauging the tension of a tension member, the combination of a plier-like device having jaws and handles for manipulation by one hand; a leaf-spring secured near its center to the lower jaw of the plier-like device, said spring reduced in thickness near one end so as to substantially increase the flexibility at said one end; a bracket mounted on the reduced end of the spring, said bracket having integral therewith a pointer; a bracket mounted on the other end of the spring, said bracket having integral therewith an indicator plate with graduations thereon corresponding to various tensions; a roller mounted on each bracket, each roller having a groove therein for supporting the tension member between the jaws of the plier-like device, whereupon operation of said device deflects the tension member in relation to the rollers to bend the leaf-spring in proportion to the tension of said tension member, which in turn moves the pointer and the indicator plate differentially in relation to each other to cause said pointer, in cooperation with the graduations on said indicator plate, to indicate the tension of the tension member; and means to secure the handles of the plier-like device in operated positions to free both hands of the operator for other purposes, such as the adjusting of the tension member while the tension gauging device remains attached thereto.

6. In a small and compact tension gauge adapted to be manipulated by one hand, the combination of two guides serving as supports for a tension member; a leaf-spring for supporting the guides in alinement with each other; a plier-like device secured to the leaf-spring intermediate the two guides, said plier-like device having handles terminating in jaws one of which is in fixed relationship to the leaf-spring, for gripping and deflecting the tension member a fixed distance in relation to the two guides to flex the leaf-spring in proportion to the tension of the tension member; and an indicating device including two parts, one of which is mounted on each of the guides, said parts adapted to be operated by the leaf-spring, upon the flexing thereof, to indicate the tension of the tension member.

7. In a device adapted to gauge the tension-load of tension members, the combination of a leaf-spring, one end of which is reduced in thickness so as to increase the flexibility at said one end; brackets mounted on each end of the leaf-spring; rollers mounted in the brackets, said rollers having grooves in the periphery thereof for supporting the tension members, said grooves forming flanges, one of which is reduced in diameter to assist in applying the device to the tension members; a plier-like device secured on the leaf-spring intermediate the rollers, said device comprising jaws and handles for deflecting the tension members in relation to the rollers to in turn cause said tension members to flex the leaf-spring in proportion to the tension thereof; a pointer integral with the bracket on the reduced end of the leaf-spring, said pointer, due to the reduced thickness of said leaf-spring, adapted to move substantially in an arc when said leaf-spring is deflected; and an indicator plate integral with the bracket on the other end of the leaf-spring, said plate, in cooperation with the pointer arranged to indicate the tension-load of the tension members.

8. In a device adapted to gauge the tension-load of tension members, the combination of a leaf-spring, one end of which is reduced in thickness so as to increase the flexibility at said one end; brackets mounted on each end of the leaf-spring; rollers mounted in the brackets, said rollers having grooves in the periphery thereof for supporting the tension members, said grooves forming flanges, one of which is reduced in diameter to assist in applying the device to the tension members; an indicator plate integral with the bracket on the thick end of the leaf-spring; a pointer integral with the bracket on the thin end of the leaf-spring, said pointer adapted to move substantially in an arc with relation to the indicator plate; and means secured on the leaf-spring intermediate the two rollers to deflect the tension members in relation to said rollers to in turn flex the leaf-spring in proportion to the tension of said tension members to cause the pointer to move in relation to the indicator plate to indicate the tension-load of said tension members.

9. In a device of the class described adapted to gauge the tension of a tension member, the combination of a plier-like device having manipulative levers terminating in jaws for gripping and deflecting the tension member; a flexible element secured in fixed relationship to one jaw of the plier-like device; two guides mounted on the flexible element on opposite sides of the plier-like device for guiding the tension member between the jaws of said plier-like device so that operation of the plier-like device will deflect the tension member a fixed distance with respect to said guides to bend said flexible element in proportion to the tension of said tension member; and means, including a dial and a pointer mounted respectively on the two guides and actuated by the flexible element, for indicating the tension of the tension member.

10. In a device for gauging the tension-load of tension members, the combination of a leaf-spring which is reduced in thickness at one end to increase the flexibility thereof; an anvil secured substantially in the middle of the leaf-spring; two tension member engaging means, one of which is mounted on each end of the leaf-spring, said engaging means adapted to locate the anvil a predetermined distance away from the tension member being gauged; a tension indicating pointer integral with the tension member engaging means, which is mounted on the reduced portion of the leaf-spring; a graduated sector integral with the other tension member engaging means and cooperating with the pointer; and manipulative means for forcing the tension member being gauged into contact with the anvil to flex the leaf-spring in proportion to the tension-load of said tension member to move the pointer in relation to the graduated sector to indicate the tension-load of said tension member.

JEAN A. ROCHÉ.